Feb. 27, 1951 H. L. HORWITZ 2,543,022
METERING CIRCUIT CONTROL FOR AUTOMATIC TELEPHONE SYSTEMS
Filed Aug. 3, 1945
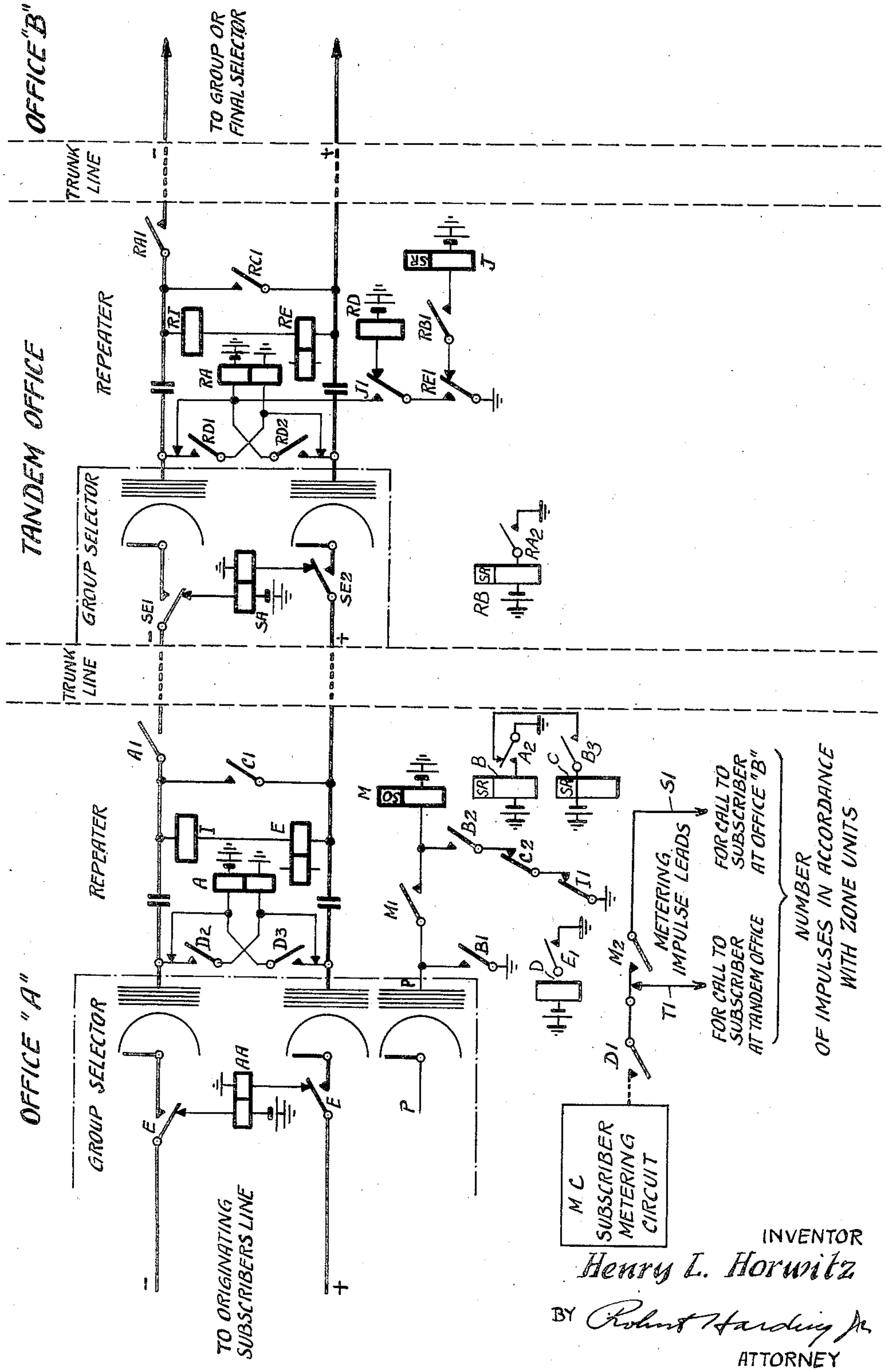
INVENTOR
Henry L. Horwitz
BY Robert Harding Jr.
ATTORNEY Patented Feb. 27, 1951 2,543,022

UNITED STATES PATENT OFFICE 2,543,022

METERING CIRCUIT CONTROL FOR AUTOMATIC TELEPHONE SYSTEMS

Henry L. Horwitz, Jamaica, N. Y., assignor to Federal Telephone and Radio Corporation, New York, N. Y., a corporation of Delaware Application August 3, 1945, Serial No. 608,692

10 Claims. (Cl. 179—9)

This invention relates to metering circuit control, particularly to a zone metering arrangement for a step-by-step system involving satellite and tandem offices, and has for its primary object to provide a metering arrangement for automatically registering a predetermined number of call units for subscribers' telephone calls in accordance with the office or zone to which the call is routed.

With the above object in view, one embodiment of the invention schematically discloses a pair of satellite offices interconnected by a tandem office, which is provided with an impulse repeater having a slow release relay adapted, on calls extended from one satellite office to another via the tandem office, to momentarily disable the repeater of the originating satellite office, whereby a contact of a bridging relay thereof is retracted to energize a switching relay, which, in operating, connects the proper number of call unit impulses to the originating subscriber's metering circuit. On telephone calls made from a satellite office to a tandem office the slow release relay of the tandem office repeater is unaffected, so that a lower number of call unit impulses is transmitted to the originating subscriber's metering circuit.

A more complete understanding of this invention will be obtained from the detailed description which follows and by reference to the appended drawing which shows one embodiment thereof.

Referring now to the drawing, there is schematically shown a satellite office A having a group selector connected through suitable switches (not shown), such as line finders or line switches, to an originating subscriber's line. The group selector is also connected through an outgoing impulse repeater, which is provided with a slow operate switching relay M for selectively connecting to the originating subscriber's metering circuit the proper number of call unit impulses in accordance with the zone or office to which the subscriber's call is extended. The outgoing repeater is shown connected by a trunk line to a group selector of a tandem office, which is adapted to switch the originating subscriber's call to subscribers within this office or to those of another satellite office, such as office B, through an outgoing impulse repeater. The outgoing repeater of the tandem office is provided with a slow release relay J having a predetermined release period, which relay is adapted to apply a momentary ground to the incoming negative conductor of the trunk line. If a call is originated at the tandem office, this momentary ground potential has no effect. When, however, the call is initiated at a satellite office, such as office A, and extended to a second satellite office, such as office B, the ground potential will disable the outgoing repeater of the originating satellite office A, which enables the switching relay M to operate and connect the proper number of call unit impulses to the originating subscriber's metering circuit. The tandem office outgoing repeater is shown connected by a trunk line to group selectors or final selectors of a second satellite office B. Since the various selector switches, repeaters, their manner of interconnection, mode of operation, etc., of a step-by-step telephone system are well-known in the art, the details thereof have been omitted where not required in order to simplify the drawing.

Before proceeding with a description of the circuit, however, the manner of illustrating the relays and associated contacts on the drawing will be first explained. It will be observed that each relay is identified by a lettered character, which indicates its functional designation, the associated contacts of said relay being identified by a numeral following the lettered character. For example, relay RD has its contacts identified by designations RD1 and RD2. The contacts are, as illustrated, disposed in the circuit in a manner to shorten the leads interconnecting the component elements of the circuit.

The invention will be more readily understood from a detailed description of the operation.

Let it be assumed that a call is originated by a calling subscriber in office A. The impulse repeater in office A will then be seized in the conventional manner by a group selector in accordance with the digits dialed by the calling subscriber. Upon seizure of the repeater, relay A thereof is operated in the usual circuit over the originating subscriber's line and closes the outgoing loop via contact A1 in series with bridging relay I and electro-polarized relay E. Relay E does not operate because of its polarized winding but relay I is energized in a circuit that can be traced from grounded battery, through one winding of the line relay SA of the tandem office group selector, through back contact SE1, over — conductor of the trunk line, through contact A1, windings of relays I and E, back over + conductor of the trunk line, and thence through back contact SE2 and the other winding of relay SA to ground. Relay I in operating, at contact I1 opens an energizing circuit for switching relay M, which circuit may have been closed by front contact B2 of relay B. Relay B, a slow release relay, had been operated by relay A in the conventional manner, front contact B1 thereof functioning to ground the incoming lead P to guard the repeater circuit against seizure by other group selectors.

Relay M, however, does not operate in view of its slow operate feature and in view also of the fact that relay I operates substantially concurrently with relay B. Further, relay M is made to operate slowly in order to eliminate faulty operation thereof in case contact B2 should close before contact I1 opens. During the dialing operation, relay C is operated, short-circuiting the line through contact C1 and further opening the energizing circuit for relay M at contact C2. Upon closure of contact C1 relay I releases and contact I1 retracts to its normal position, contact C2 having opened the energizing circuit of relay M before contact I1 has reclosed, still preventing relay F from operating.

Let it next be assumed that the calling subscriber of office A has dialed a called subscriber in the tandem office. In this instance the reverse battery control of the tandem office operates in the conventional manner to operate electro-polarized relay E of the repeater in office A, which relay E energizes through contact E1 a battery reversing relay D, contact D1 thereof connecting the calling subscriber's metering circuit MC, shown in block form, to a tandem office impulse lead T1, which connects a predetermined number of impulses in accordance with the zone unit applicable to the tandem office subscriber. Relay M, therefore, does not operate, the calling subscriber's metering circuit MC being connected to, for example, a two-impulse lead in which two units are charged for this call.

If the call is routed through the tandem office to a subscriber in a second satellite office, such as office B, the repeater of the tandem office is seized in the conventional manner, relay RA thereof being operated to extend the call via front contact RA1. Slow release relay RB is operated and at front contact RB1 closes an energizing circuit for slow release relay J, which circuit can be traced from grounded battery through winding thereof, contact RB1, and thence through back contact RE1 to ground. Front contact J1 prepares a ground circuit for the — conductor of the trunk line. When the called subscriber of office B answers, reverse battery is applied from office B to the tandem office repeater. Electro-polarized relay RE is operated thereby and contact RE1 thereof completes the above ground circuit for the — conductor of the trunk line. However, contact RE1 also opens the above-traced circuit of relay J, which releases after a predetermined interval to interrupt the ground circuit. In this manner the time established for this ground connection is controlled by the releasing time of relay J following operation of the electro-polarized relay RE.

Referring back to application of ground to the — conductor of the trunk line, it will be noted that both trunk line leads have positive potential thereon which is equivalent to a short circuit. Relay I in office A therefore releases and closes an energizing circuit for switching relay M, which may be traced from grounded battery through winding thereof, operated contact B2, non-operated contact C2, and thence through retracted contact I1 to ground. Relay M, in operating, closes a locking circuit for itself over contact M1 to the release trunk via conductor P. At contact M2 a circuit is closed for the subscriber's metering circuit MC whereby metering impulse lead S1 is connected thereto, while impulse lead T1 is disconnected therefrom.

Referring back to relay J of the tandem office, this relay in releasing completes a circuit for battery reversing relay RD of the tandem office repeater, which circuit can be traced from grounded battery through the winding thereof, retracted contact J1, and thence through operated contact RE1 to ground. Relay RD, in operating, at contacts RD1 and RD2 reverses the battery supply back to the repeater of office A, whereupon electro-polarized relay E thereof is energized. Relay I is also operated but operation of contact I1 has no effect on relay M in view of the locking circuit therefor over contact M1. Relay E in turn operates battery reversing relay D and contact D1 thereof closes the subscriber's metering circuit MC in the conventional manner, so that metering impulse lead S1 is connected thereto. In this instance, four call units, for example, may be charged for such a call. It is, of course, understood that any number of call units may be charged for each type of call.

Upon completion of conversation between the calling and called subscribers, the circuit is released in the usual manner and switching relay M is restored to its normal condition, the metering circuit MC thereby being placed in readiness for a subsequent call. It is to be noted that should a call be originated in the tandem office, the momentary ground impressed on the — trunk line by relay J will produce no effect on the switch train ahead.

While this invention has been shown and described in accordance with the preferred embodiment merely for the purpose of illustration, it is, of course, understood that various modifications may be made and that the features thereof may be applied to many other fields without departing from the scope of the invention, as defined in the appended claims.

What is claimed is:

1. An automatic telephone system comprising, in combination, a satellite office including a subscriber's metering circuit, a meter switching relay in said office, a tandem office, a trunk interconnecting said offices, a second satellite office, a second trunk interconnecting said tandem office and said second satellite office, and means in said tandem office responsive to a call being routed from said first satellite office to said second satellite office via said tandem office for rendering effective said meter switching relay, whereby a predetermined number of zone units is registered by said subscriber's metering circuit for said routed call.

2. An automatic telephone system comprising, in combination, a satellite office including a subscriber's metering circuit, a meter switching relay in said office, a tandem office, a trunk interconnecting said offices, a second satellite office, a second trunk interconnecting said tandem office and said second satellite office, and means including a relay in said tandem office responsive to a call being routed from said first satellite office to said second satellite office via said tandem office for rendering effective said meter switching relay, whereby a call of predetermined zone units is registered upon said subscriber's metering circuit.

3. An automatic telephone system comprising, in combination, a satellite office including a subscriber's metering circuit, a meter switching relay in said office associated with said circuit, a tandem office connected to said office, a second satellite office connected to said tandem office, means including a relay in said tandem office responsive to a call being completed from said first satellite office to said second satellite office via said tandem office for rendering effective said meter switching relay, and means responsive to operation of said switching relay for connecting to said subscriber's metering circuit a predetermined number of impulses in accordance with the zone units to be assessed for said completed call.

4. An automatic telephone system comprising, in combination, a satellite office, a repeater therein, a switching relay associated with said repeater, a subscriber's metering circuit in said office, a tandem office connected to said satellite office, a repeater in said tandem office, a second satellite office connected to said tandem office, means in said tandem office repeater rendered effective upon a telephone call being completed through said tandem office to said second satellite office, means responsive to said preceding means for rendering said switching relay effective, whereby said subscriber's metering circuit is directed to register a predetermined number of units for said telephone call.

5. An automatic telephone system comprising, in combination, a satellite office, an outgoing repeater therein, a switching relay associated with said repeater, a subscriber's metering circuit in said satellite office adapted for registering charges of telephone calls originated therein, a tandem office connected to said satellite office, an outgoing repeater in said tandem office, a second satellite office connected to said tandem office, means in said tandem office repeater rendered effective upon a call being completed through said tandem office from said first satellite office to said second satellite office, a relay in said tandem office responsive to said preceding means for rendering said switching relay effective, whereby said subscriber's metering circuit is energized to register a predetermined number of units for said telephone call.

6. An automatic telephone system comprising, in combination, a satellite office, an outgoing repeater therein, a switching relay associated with said repeater, a subscriber's metering circuit in said satellite office, a tandem office connected to said satellite office, an outgoing repeater in said tandem office, a second satellite office connected to said tandem office, means including a relay associated with said tandem office repeater rendered effective upon a call being completed through said tandem office from said first satellite office to said second satellite office, a bridging relay in said first satellite office momentarily rendered ineffective by said preceding relay for rendering said switching relay effective, whereby said subscriber's metering circuit is energized to register a predetermined number of units for said telephone call.

7. An automatic telephone system of the step-by-step type comprising, in combination, a calling office including a subscriber's metering circuit, a called office, a tandem office interconnecting said offices, a switching relay in said calling office, means including a relay in said tandem office responsive to a telephone call being completed between said calling and called offices for rendering effective said switching relay, a pair of zone unit conductors adapted for connection to said subscriber's metering circuit, one of said conductors being representative of a call to said called office and the other of said conductors being representative of a call to said tandem office, and means responsive to said switching relay for selecting said called office zone unit conductor.

8. An automatic telephone system comprising, in combination, a calling office, including a subscriber's metering circuit, a called office, a tandem office interconnecting said offices, an impulse repeater in each of said calling and tandem offices, means including a bridging relay in said calling office repeater, means including a relay associated with said tandem office repeater for momentarily releasing said bridging relay, a pair of zone unit conductors adapted for connection to said subscriber's metering circuit, one of said conductors representative of a call to said called office and the other of said conductors representative of a call to said tandem office, and means including a switching relay responsive to said bridging relay for selecting a particular one of said zone unit conductors.

9. An automatic telephone system comprising, in combination, a calling office including a subscriber's metering circuit, a called office, a tandem office interconnecting said offices, a repeater in each of said calling and tandem offices, means including a bridging relay in said calling office repeater, means including a relay associated with said tandem office repeater for momentarily releasing said bridging relay, a pair of zone unit conductors adapted for connection to said subscriber's metering circuit, one of said conductors being representative of a call to said called office and the other of said conductors being representative of a call to said tandem office, and means including a switching relay responsive to release of said bridging relay for seizing said called office zone unit conductor and for rendering ineffective said tandem office zone unit conductor.

10. An automatic telephone system comprising, in combination, an originating office, a tandem office connected thereto, metering means in said originating office for registering charges of telephone calls, means including a relay in said tandem office effective upon completion of a telephone connection between said originating office and another office via said tandem office, a bridging relay in said originating office rendered effective upon extension of said telephone call to said tandem office, said bridging relay being momentarily released by operation of said tandem office relay, a meter switching relay in said originating office responsive to said release of said bridging relay, and a pair of zone unit conductors adapted for connection to said metering means, one of said conductors being representative of a call to said called office and the other conductor being representative of a call to said tandem office, said tandem office zone unit conductor being normally connected to said metering means, and said meter switching relay being adapted to connect said called office zone unit conductor to said metering means and to render said tandem office zone unit conductor ineffective.

HENRY L. HORWITZ.

REFERENCES CITED

The following references are of record in the file of this patent:

UNITED STATES PATENTS

| Number | Name | Date |
|---|---|---|
| 1,804,408 | Fowler | May 12, 1931 |
| 1,862,536 | Hartley et al. | June 14, 1932 |
| 1,866,597 | Hoefert et al. | July 12, 1932 |
| 2,072,234 | Wochinger | Mar. 2, 1937 |
| 2,232,181 | McClew et al. | Feb. 18, 1941 |
| 2,232,189 | Taylor et al. | Feb. 18, 1941 |